US012210768B2

(12) United States Patent
Niu et al.

(10) Patent No.: US 12,210,768 B2
(45) Date of Patent: Jan. 28, 2025

(54) FLEXIBLE MEMORY EXTENSION SYSTEMS AND METHODS

(71) Applicant: Alibaba (China) Co., Ltd., Hangzhou (CN)

(72) Inventors: Dimin Niu, Sunnyvale, CA (US); Yijin Guan, Beijing (CN); Shengcheng Wang, Shanghai (CN); Yuhao Wang, Sunnyvale, CA (US); Shuangchen Li, Sunnyvale, CA (US); Hongzhong Zheng, Los Gatos, CA (US)

(73) Assignee: Alibaba (China) Co., Ltd., Hangzhou (CN)

(*) Notice: Subject to any disclaimer, the term of this patent is extended or adjusted under 35 U.S.C. 154(b) by 181 days.

(21) Appl. No.: 17/866,403

(22) Filed: Jul. 15, 2022

(65) Prior Publication Data

US 2022/0350526 A1    Nov. 3, 2022

(30) Foreign Application Priority Data

Mar. 16, 2022    (CN) .......................... 202210261806.0

(51) Int. Cl.
    *G06F 13/00*    (2006.01)
    *G06F 3/06*    (2006.01)
(52) U.S. Cl.
    CPC .......... *G06F 3/0655* (2013.01); *G06F 3/0604* (2013.01); *G06F 3/0679* (2013.01)
(58) Field of Classification Search
    None
    See application file for complete search history.

(56) References Cited

U.S. PATENT DOCUMENTS

| | | |
|---|---|---|
| 5,958,043 A | 9/1999 | Motomura |
| 6,615,340 B1 | 9/2003 | Wilmot, II |
| 6,745,384 B1 | 6/2004 | Biggerstaff |
| 9,886,377 B2 | 2/2018 | Werner et al. |
| 10,503,416 B1 * | 12/2019 | Himelstein ............. G06F 3/065 |
| 10,810,139 B2 * | 10/2020 | Shaeffer ................ G06F 3/0619 |
| 2006/0101245 A1 | 5/2006 | Nair et al. |
| 2006/0161612 A1 | 7/2006 | Gustavson et al. |
| 2010/0088739 A1 | 4/2010 | Hall et al. |

(Continued)

OTHER PUBLICATIONS www.wikipedia.org, DIMMs, Jan. 2018, p. 1-5 (Year: 2018).*

*Primary Examiner* — Henry Tsai
*Assistant Examiner* — Dean Phan

(57) ABSTRACT

The presented systems enable efficient and effective network communications. The presented systems enable efficient and effective network communications. In one embodiment a memory device includes a memory module, including a plurality of memory chips configured to store information; and an inter-chip network (ICN)/shared smart memory extension (SMX) memory interface controller (ICN/SMX memory interface controller) configured to interface between the memory module and an inter-chip network (ICN), wherein the ICN is configured to communicatively couple the memory device to a parallel processing unit (PPU). In one exemplary implementation, the ICN/SMX memory controller includes a plurality of package buffers, an ICN physical layer interface, a PRC/MAC interface, and a switch. The memory device and be a memory card including memory module (e.g., DDR DIMM, etc.).

20 Claims, 12 Drawing Sheets

(56) References Cited

U.S. PATENT DOCUMENTS

| | | | |
|---|---|---|---|
| 2012/0054455 A1* | 3/2012 | Wang | G06F 12/0607 |
| | | | 711/E12.079 |
| 2013/0073920 A1 | 3/2013 | Nie et al. | |
| 2014/0195743 A1* | 7/2014 | Fleischer | G06F 3/0625 |
| | | | 711/151 |
| 2014/0372825 A1 | 12/2014 | Jeong et al. | |
| 2015/0301887 A1 | 10/2015 | Zhang et al. | |
| 2015/0378734 A1 | 12/2015 | Hansen et al. | |
| 2016/0342351 A1* | 11/2016 | Li | G06F 3/0659 |
| 2017/0097884 A1 | 4/2017 | Werner et al. | |
| 2017/0262389 A1* | 9/2017 | Raupp Da Rosa | G06F 13/28 |
| 2018/0308202 A1* | 10/2018 | Appu | G06T 1/20 |
| 2019/0104029 A1* | 4/2019 | Guim Bernat | H04L 41/5006 |

\* cited by examiner

1000

1010
Generating a memory communication in a first processing component, wherein the memory communication comprises an address associated with a a storage location in a first memory component and the memory communication is compatible for communication over an inter-chip network (ICN).

1020
Selecting an interconnect from among a plurality of interconnects included in the ICN, wherein a selected interconnect couples the first processing component and the first memory component.

1030
Forwarding the memory communication request from the first processing component towards the first memory component via the selected interconnect included in the ICN.

Fig. 10

FLEXIBLE MEMORY EXTENSION SYSTEMS AND METHODS

RELATED APPLICATIONS

This application claims the benefit of and priority to China Patent Application No. 202210261806.0 filed Mar. 16, 2022, by Dimin Niu et al., which is hereby incorporated by reference in its entirety.

FIELD OF THE INVENTION

The present invention relates to the field of information processing and communication in interconnected chip networks.

BACKGROUND OF THE INVENTION

Numerous electronic technologies such as digital computers, calculators, audio devices, video equipment, and telephone systems facilitate increased productivity and cost reduction in analyzing and communicating data and information in most areas of business, science, education, and entertainment. Electronic components can be used in a number of important applications (e.g., medical procedures, vehicle aided operation, financial applications, etc.) and frequently these activities involve processing and storing large amounts of information. These applications typically involve large amounts of information processing. Handling (e.g., storing, processing, communicating, etc.) the large amounts of information can be problematic and difficult.

In many applications it is important for systems to process information rapidly and accurately and the ability to rapidly and accurately process information is often dependent on access to information. Traditional systems typically have difficulty sorting and processing large amounts of information, particularly in parallel processing environments. Providing to little memory is usually very detrimental and often results in complete application failure. Conventional attempts at providing large amounts of dedicated memory at each parallel processing resource with enough dedicated memory capability to store all the information is usually prohibitively expensive. In addition, each processing resource typically has different memory storage access needs at different times and much of the memory resources can be idle or essentially waisted. Traditional attempts at sharing memory resources often gives rise to communication issues and can considerably slow down access to the information by a processing resource, resulting in considerable performance limitations and deterioration.

FIG. 1 is a block diagram illustrating an example of a conventional system 100 that attempts to share memory resources. In general, the system 100 includes a number of servers, and each server includes a number of parallel computing units. In the example of FIG. 1, the system 100 includes servers 101 and 102. The server 101 includes parallel processing units (PPUs) PPU_0a through PPU_n, Peripheral Component Interconnect Express (PCIe) bus 111, memory card 113, a network interface controller or card (NIC) 112, a host central processing unit (CPU) 114, and memory 115. The server 102 includes parallel processing units (PPUs) PPU_0b through PPU_n, Peripheral Component Interconnect Express (PCIe) bus 121, memory card 123, a network interface controller or card (NIC) 122, and a host central processing unit (CPU) 124. Each of the PPUs includes elements such as a processing core and memory (not shown). In one embodiment, a PPU can be a neural network processing unit (NPU). In one exemplary implementation, a plurality of NPUs are arranged in a parallel configuration. Peripheral Component Interconnect Express (PCIe) bus 111 is communicatively coupled to PPU_0a through PPU_n, memory card 113, a host central processing unit (CPU) 114, and a network interface controller or card (NIC) 112, which is communicatively coupled to network 130. Host central processing unit (CPU) 114 is coupled to memory 115 (e.g., RAM, DRAM, DDR4, DDR5, etc.). Peripheral Component Interconnect Express (PCIe) bus 121 is communicatively coupled to PPU_0b through PPU_n, memory card 123, a host central processing unit (CPU) 124, and a network interface controller or card (NIC) 122, which is communicatively coupled to network 130. In one example network 130 can be an ethernet network.

The system 100 incorporates unified memory addressing space using, for example, the partitioned global address space (PGAS) programming model. In many applications, a particular PPU may need to access information stored on a memory card of the system. Thus, in the example of FIG. 1, a PPU-0a on the server 101 may need to access information stored on memory card 113 and 123. To access information on memory card 113, the information is communicated via BUS 111 somewhere in the system, and depending on where in the system. For example, to write data from PPU_0a to memory card 113 on the server 101, the data is sent from PPU_0a over the PCIe bus 111 to memory card 113; and to write data from PPU_0a on the server 101 to memory card 123 on the server 102, the data is sent from PPU_0a over the PCIe bus 111 to the NIC 121, then over the network 130 to the NIC 122, then over the PCIe bus 112 to memory card 123.

The system 100 can be used for applications such as graph analytics and graph neural networks, and more specifically for applications such as online shopping engines, social networking, recommendation engines, mapping engines, failure analysis, network management, and search engines. Such applications execute a tremendous number of memory access requests (e.g., read and write requests), and as a consequence also transfer (e.g., read and write) a tremendous amount of data for processing. While PCIe bandwidth and data transfer rates are considerable, they are nevertheless limiting for such applications. As a practical matter PCIe is typically simply too slow and its bandwidth is too narrow for such applications. The slow and narrow bandwidth of the conventional PCIe bus approaches can also have the effect of limiting conventional attempts at flexibly configuring and extending memory capabilities.

SUMMARY

The presented systems enable efficient and effective network communications. In one embodiment a memory device includes a memory module, including a plurality of memory chips configured to store information, and an inter-chip network (ICN)/shared smart memory extension (SMX) memory interface controller (ICN/SMX memory interface controller) configured to interface between the memory module and an inter-chip network (ICN), wherein the ICN is configured to communicatively couple the memory device to a parallel processing unit (PPU). In one exemplary implementation, the ICN/SMX memory interface controller includes an ICN interface, a shared smart memory extension (SMX) interface, a plurality of package buffers, and a switch. The ICN interface is configured to communicatively couple with the ICN. The shared smart memory extension (SMX) interface is configured to communicatively couple with the ICN interface. The plurality of package buffers are configured to buffer information packages from the SMX interface. The switch is configured to communicatively couple the plurality of package buffers to the SMX interface and route information to and from the plurality of package buffers.

It is appreciated that the ICN/SMX memory interface can enable flexible extension of memory resources available to processing resources. In one embodiment, the ICN/SMX memory interface and ICN enable a direct communication connection between the memory device and the PPU, wherein the direct connection flexibly extends the PPU access to the memory module. The ICN/SMX memory interface and ICN can enable a communication coupling between the memory device and the PPU that is overall faster than other communication buses between the memory device and PPU. In one exemplary implementation, the direct connection flexibly extends access by both the PPU and another PPU to the memory module.

A memory device can include a processing element array component configured to perform parallel processing on the memory device. In one embodiment, a processing element array component includes a plurality of process elements configured to process the information, and a process element controller configured to control a flow of the information to and from the plurality of process elements. In one exemplary implementation, a processing element array component processes information associated with accelerating graph processing.

It is appreciated the memory device can be compatible with various memory configurations. The ICN/SMX memory interface controller can be dynamically configurable for various flexible extension architecture configurations, including one memory device to one PPU, one memory device to multiple PPUs, multiple memory devices to one PPU, and multiple memory devices to multiple PPUs. The memory device can be configured as a memory card including a memory module. The memory module can be a dual in-line memory module (DIMM). The memory module can be a double data rate dual in-line memory module (DDR DIMM).

In one embodiment, a memory storage communication method is implemented. In one exemplary implementation, the method includes generating a memory access request in a first processing component, selecting an interconnect from among a plurality of interconnects included in the ICN, and forwarding the memory access request from the first processing component towards the first memory component via the selected interconnect included in the ICN. In one embodiment, the memory access request comprises an address associated with a location in a first memory component and the memory access request is compatible for communication over an inter-chip network (ICN). The communication can be compatible with a shared memory extension protocol. In one exemplary implementation, a selected interconnect couples the first processing component and the first memory component.

In one embodiment, the first processing component and first memory component are included in a first node of the ICN, and wherein the first processing component and first memory component are also communicatively coupled to each other via a bus included in the first node, wherein the bus does not include the ICN. The first memory component can be included in a first node of the ICN and a second memory component can be included in a second node of the ICN. The first memory component and second memory component can also be communicatively coupled via another network in addition to the ICN. In one exemplary implementation, the ICN can enable dynamic flexible extension of available memory resources for PPUs communicatively coupled to the ICN. In one exemplary implementation. the other network is communicatively coupled to a first network interface card included in the first node and a second interface card included in the second node. The first memory component and a second memory component can be included in a first node of the ICN and the first memory component and second memory component are communicatively coupled to one another via a shared memory extension protocol. The information can be pushed from the first memory component to the second memory component in a push mode and the information can be pulled from the second memory component to the first memory component in a pull mode. In one embodiment, the method can further include receiving another memory access request via another interconnect included in the ICN.

In one embodiment a system includes: a plurality of processing cores, a plurality of memories, and a plurality of interconnects in an inter-chip network (ICN). A first set of the plurality processing cores can be included in a first chip. The plurality of memories include a first memory set that is internal memory in the first chip and a second memory set that is external memory. The first set of memories and the second set of memories are coupled to the first set of the plurality of processing cores. The ICN is configured to communicatively couple the plurality of processing cores and the second memory set. The second memory set is available to the plurality of processing cores as an extension to the first memory set. The second memory set can include a memory device comprising: a memory module, including a plurality of memory chips configured to store information, and ICN/SMX memory interface controller configured to interface between the memory module and an inter-chip network (ICN) configured to communicatively couple the plurality of processing cores and the second memory set enabling flexible extension of memory resources available to the plurality of processing cores. The ICN can include interconnection links that communicatively couple a parallel processing unit (PPU) and the second memory set, wherein the PPU includes the plurality of processing cores and the first memory set. In one embodiment, memories within the second memory set are communicatively via a shared smart memory extension (SMX) protocol. The ICN/shared memory extension (SMX) controller can be dynamically configurable for various flexible extension architecture configurations, including one memory card to one PPU, one memory card to multiple PPUs, multiple memory cards to one PPU, and multiple memory cards to multiple PPUs.

These and other objects and advantages of the various embodiments of the invention will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the detailed description, serve to explain the principles of the disclosure.

FIG. 10 is a block diagram of an exemplary information storage method in accordance with one embodiment.

DETAILED DESCRIPTION

Figure 1:
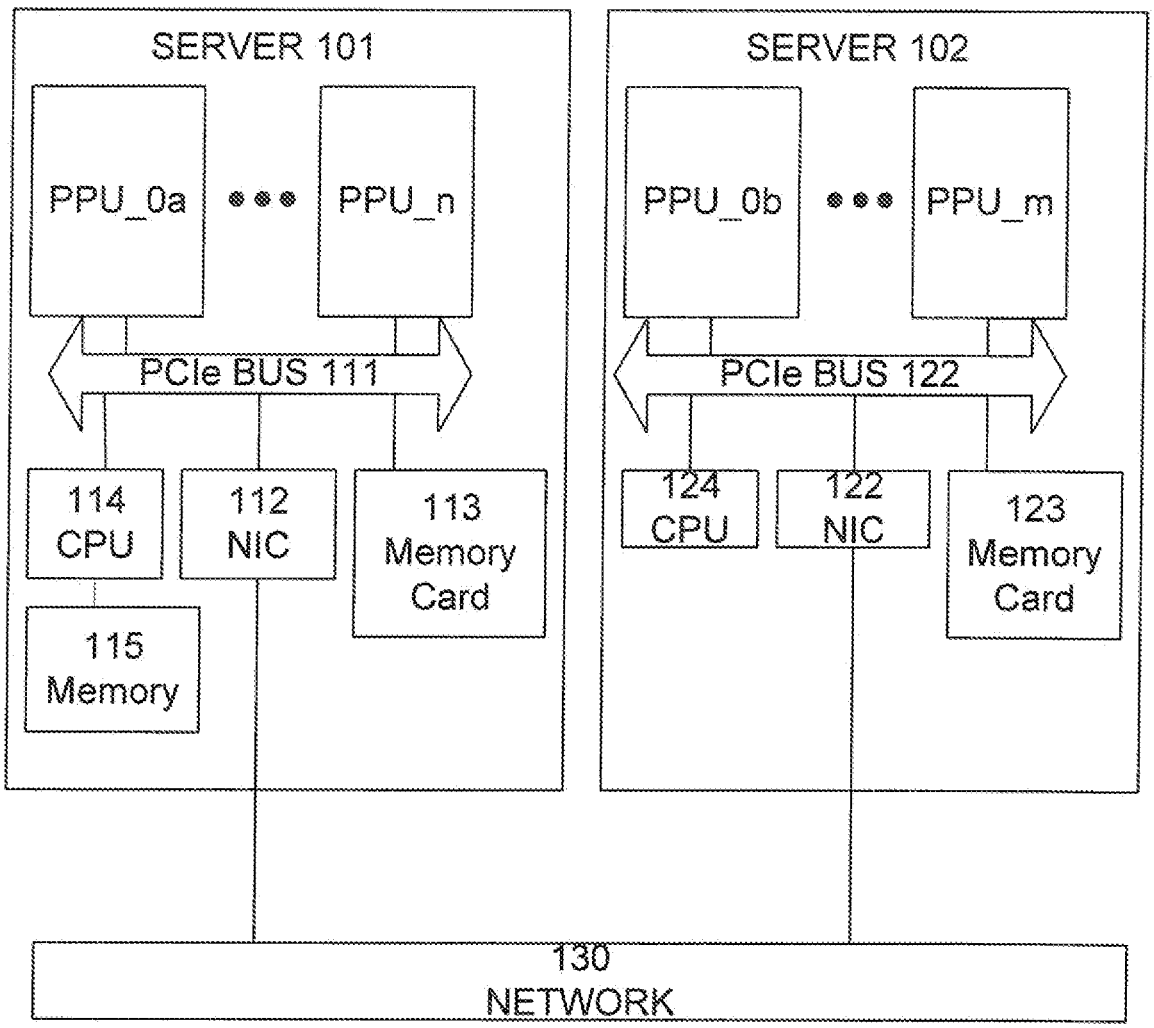
FIG. 1 illustrates an example of a conventional system.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computing system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "accessing," "allocating," "storing," "receiving," "sending," "writing," "reading," "transmitting," "loading," "pushing," "pulling," "processing," "caching," "routing," "determining," "selecting," "requesting," "synchronizing," "copying," "mapping," "updating," "translating," "generating," "allocating," or the like, refer to actions and processes of an apparatus or computing system (e.g., the methods of FIGS. 7, 8, 9, and 10) or similar electronic computing device, system, or network (e.g., the system of FIG. 2A and its components and elements). A computing system or similar electronic computing device manipulates and transforms data represented as physical (electronic) quantities within memories, registers or other such information storage, transmission or display devices.

Some elements or embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media can include double data rate (DDR) memory, random access memory (RAM), static RAMs (SRAMs), or dynamic RAMs (DRAMs), read only memory (ROM), electrically erasable programmable ROM (EEPROM), flash memory (e.g., an SSD) or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

The systems and methods are configured to efficiently and effectively enable memory extension capabilities. In one embodiment, flexible and extendable memory schemes are implemented in interconnected chip networks (ICNs). The interconnected chip networks facilitate increased communication bandwidth and speed between processing resources and external memory (e.g., off chip, etc.) over conventional approaches. An ICN can be considered a high-speed network using a high-speed protocol. The interconnected chip networks can also facilitate increased flexible implementation and utilization of storage resources. In one exemplary implementation, the interconnected chip networks are compatible with and leverage shared smart memory extension (SMX) features to facilitate increased flexible implementation and utilization of storage resources. In one exemplary implementation, the memory cards are considered SMX memory cards.

In one embodiment a parallel processing unit (PPU) is coupled to a memory device. The memory device can include a memory module including a plurality of memory chips configured to store information; and an ICN/SMX memory interface controller configured to interface between the memory module and an inter-chip network (ICN). The ICN is configured to communicatively couple a parallel processing unit PPU to the memory device.

An ICN/SMX memory interface controller can be configurable for various expansion architectures. An ICN/SMX interface memory controller can be dynamically configurable for various flexible extension architecture configurations, including one memory card to one PPU (e.g., 1v1, etc.), one memory card to multiple PPUs (e.g., 1vn, etc.), multiple memory cards to one PPU (e.g., nv1, etc.), and multiple memory cards to multiple PPUs (e.g., nvn, etc.). The memory module can be a single in-line memory module (SIMM). The memory module can be a dual in-line memory module (DIMM). The memory module can be a double data rate dual in-line memory module (DDR DIMM). The memory module can include various types of memory (e.g., DRAM, SDRA, flash memory, etc.). It is appreciated that a PPU can include various types of parallel processing units, including a Central Processing Unit (CPU), a Graphics Processing Unit (GPU), a Field Programmable Gate Array (FPGA), and so on.

Figure 2A:
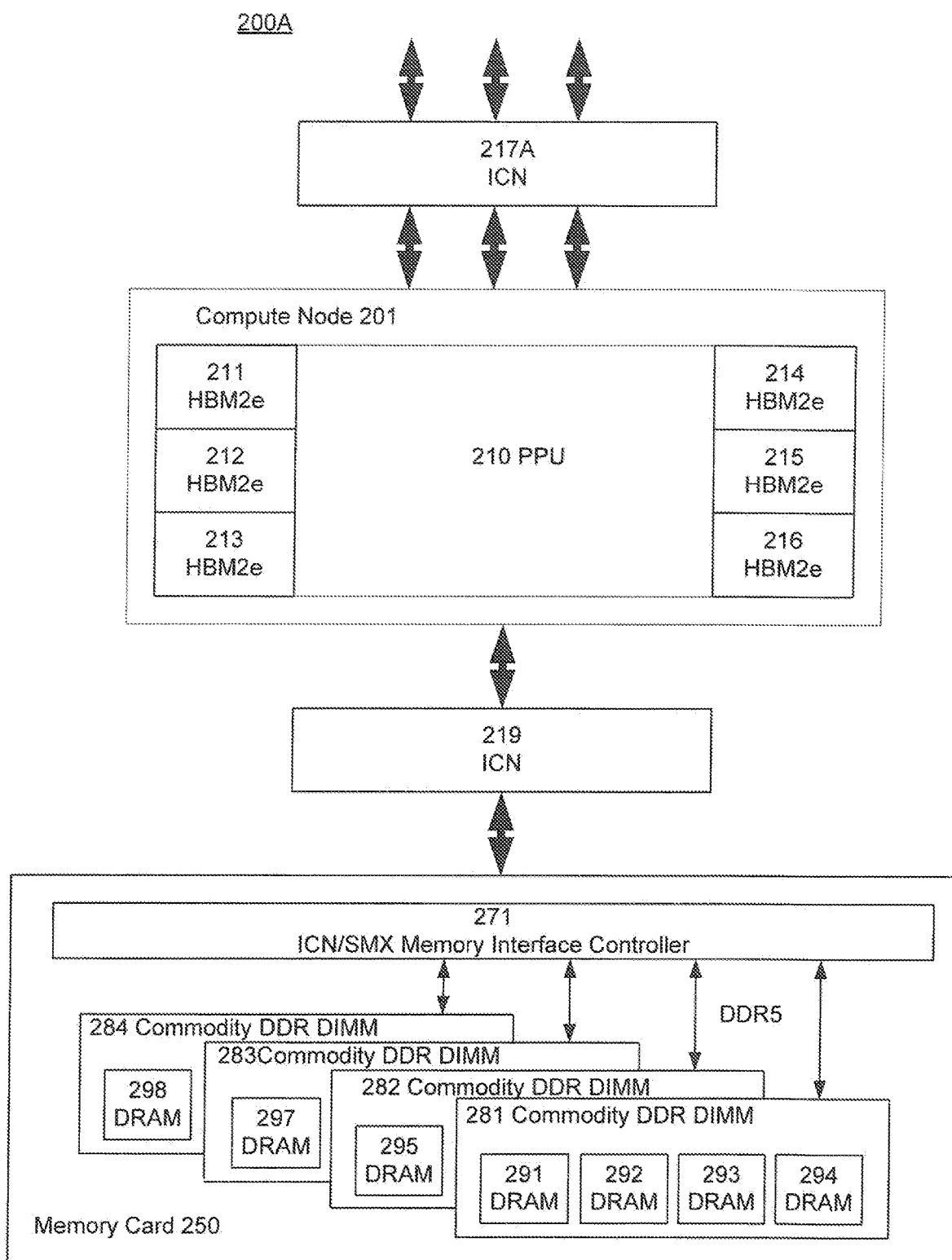
FIG. 2A is a block diagram illustrating an example of a system in accordance with one embodiment.

FIG. 2A is a block diagram illustrating an example of a system 200A in accordance with one embodiment. In general, the system 200A can be used for any information storage and processing, including massive data storage and parallel processing. In one embodiment, the system 200A can be used for neural network and artificial intelligence (AI) workloads.

It is appreciated that systems (e.g., 200, 300, 400, etc.) shown in the figures can include elements or components in addition to those illustrated and described herein, and the elements or components can be arranged as shown in the figures or in a different way. Some of the blocks in the example systems and components (e.g., 200, PPU_0, memory card 250, etc.) may be described in terms of the function they perform. Where elements and components of the system are described and illustrated as separate blocks, the present disclosure is not so limited; that is, for example, a combination of blocks/functions can be integrated into a single block that performs multiple functions. In one embodiment, a system (e.g., 200A, etc.) can be scaled up to include additional (e.g., PPUs, memory cards, etc.) and is compatible with different scaling schemes including hierarchical scaling schemes and flattened scaling schemes.

In general, a system includes a number of compute nodes and each compute node includes a number of parallel processing units or chips (e.g., PPUs). It is appreciated that the presented extended/expanded memory capabilities are compatible for utilization with various compute node configurations. In one exemplary implementation or application scenario, the compute nodes are similar to servers in a network environment.

System 200A includes compute node 201 and memory card 250. Compute node 201 includes parallel processing unit PPU 210, High Bandwidth Memory version 2e (e.g., HBM2e) 211, 212, 213, 214, 215, and 216. Compute node 201 is communicatively coupled to ICN 217 and 219. ICN 219 is communicatively coupled to Memory Card 250. Memory card 250 includes ICN/SMX memory interface controller 271 and commodity DDR DIMM 281, 282, 283, and 284. The commodity DDR DIMMs 281, 282, 283, and 284 include a plurality of DRAMs (e.g., 291, 292, 293, 294, 295, 297, 298, etc.).

In one embodiment, ICN 219 and ICN/SMX memory interface controller 271 facilitate communication between PPUs and memories. In one exemplary implementation, the ICN 219 enables high speed communication between the memories (DRAMs 291, 292, etc.) and PPU 210. It is appreciated that ICNs presented herein are a novel communication system that facilitates communications between information storage resources and processing resources at greater speeds and bandwidths than traditional systems and methods. In addition to providing significantly increased bandwidth and speed over traditional systems, system 200A provides increased memory extension and memory utilization flexibility.

In one embodiment, ICN 219 includes direct connections that communicatively couple PPU 210 and memory card 250. The direct connections enable processing resources (e.g., PPU 210, etc.) to more efficiently and effectively access memory resources (memory card 250, etc.) than conventional systems that are limited to slower communication architectures (e.g., PCIe, etc.). In one embodiment, an ICN/SMX memory interface controller can include SMX features and capabilities. In one exemplary implementation, the SMX protocol enables high speed communication between the memories within a memory card and the ICN protocol enables high speed communication to and from a memory card (e.g., between memory cards and PPUs, between multiple memory cards, etc.). The communications can include conveying information between software and applications. Additional details of ICN and SMX communications are explained in other portions of this description.

Figure 2B:
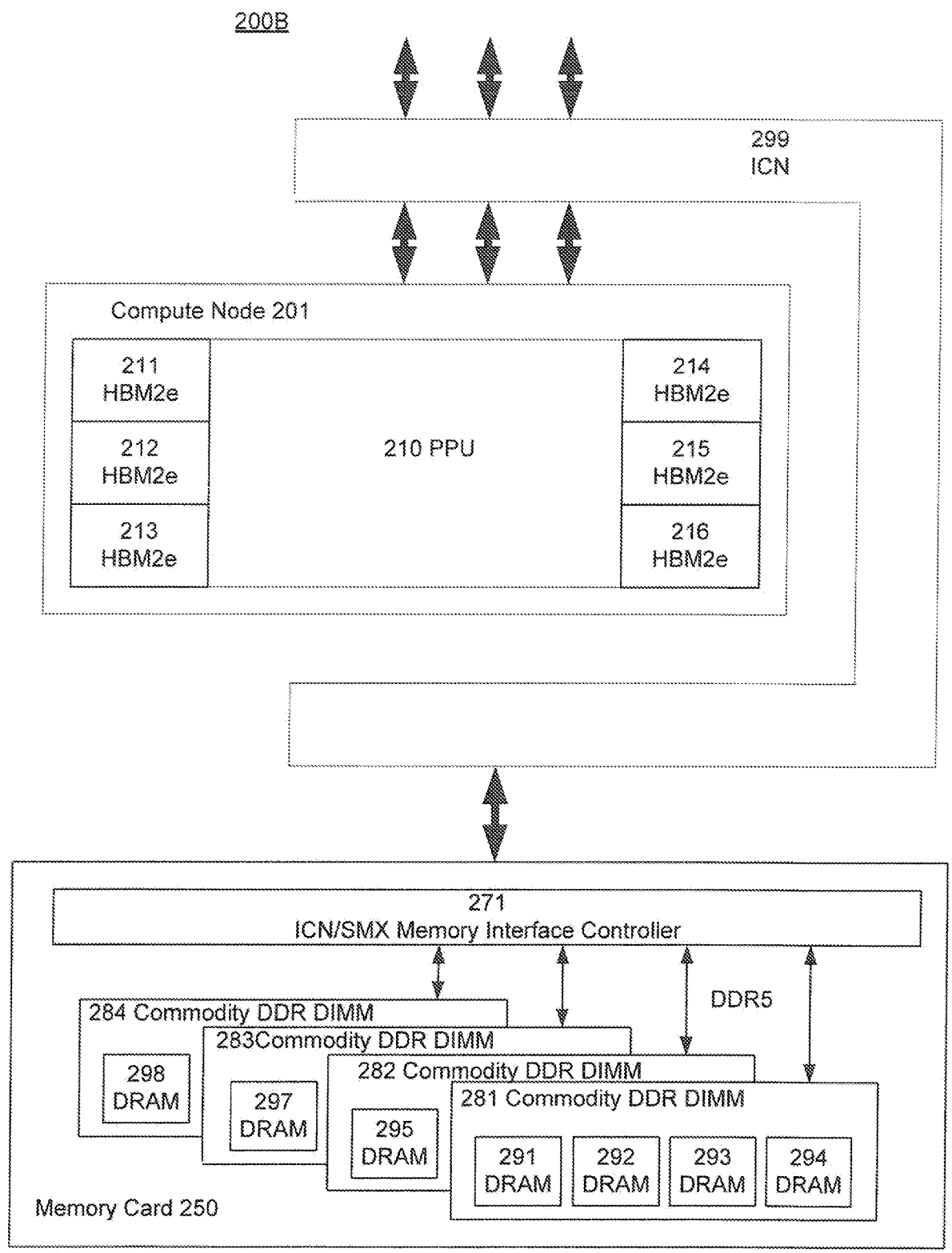
FIG. 2B is a block diagram of another exemplary system in accordance with one embodiment.

FIG. 2B is a block diagram of an exemplary system 200B in accordance with one embodiment. System 200B is similar to system 200A except system 200B has one ICN 299 that communicatively couples compute node 201 to memory card 250.

Figure 3:
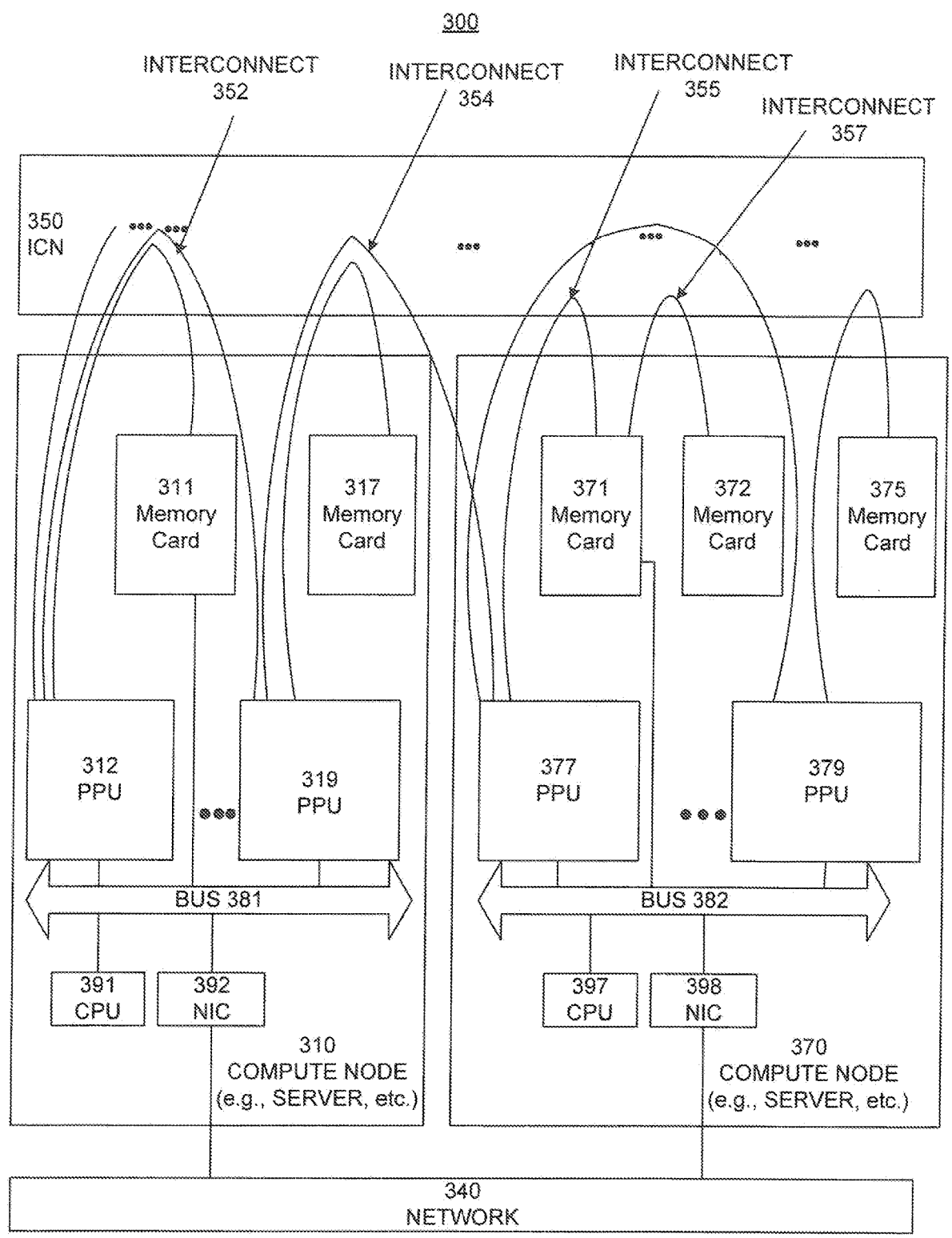
FIG. 3 is a block diagram illustrating an example of a parallel processing unit (PPU) architecture incorporating memory extension in accordance with one embodiment.

FIG. 3 is a block diagram of an exemplary system 300 in accordance with one embodiment. In general, the system 300 includes a number of compute nodes and each compute node includes a number of parallel computing units or chips (e.g., PPUs) and a number of memory cards. System 300 includes compute node 310 and compute node 370 communicatively coupled to INC 350 and INC 340. It is appreciated that the presented extended memory capabilities are compatible for utilization with various compute node configurations. In one exemplary implementation or application scenario, the compute nodes are similar to servers in a network environment.

Communication to and from the memory cards can be at the command level (e.g., a DMA copy) and/or at the instruction level (e.g., a direct load or store). The ICN 350 allows compute nodes (e.g., servers, etc.) and PPUs in the system 300 to communicate without using the network bus 340 (e.g., a PCIe bus, etc.), thereby avoiding its bandwidth limitations and relative lack of speed. Communication between PPUs can include the transmission of memory access requests (e.g., read requests and write requests) and the transfer of data in response to such requests. Communication can be direct or indirect.

In one embodiment, a compute node includes PPUs and memory cards. Compute node 310 includes PPU 312 communicatively coupled to memory card 311 via ICN 350 and PPU 317 communicatively coupled to memory card 317 via ICN 335. Compute node 370 includes PPU 377 communicatively coupled to memory card 371 via ICN 350 and PPU 379 communicatively coupled to memory card 375 via ICN 350. Memory card 371 is communicatively coupled to memory card 372 via ICN 350. It is appreciated that the ICN 350 communicatively coupling the memory cards to the PPUs (e.g., 311, 317, etc.) provides much greater bandwidth and communication speeds than conventional approaches that were limited to communication over narrower and slower bus protocols (e.g., PCIe, etc.). In addition to providing significantly increased bandwidth and speed over conventional systems, system 300 provides increased memory extension and flexibility.

The system 300 of FIG. 3 includes high-bandwidth inter-chip network (ICN) 350, which allows communication between the PPUs in the system 300. In one embodiment, the memory cards (e.g., 311, 317, 371, 372, 375, etc.) and PPUs (312, 319, 377, 379, etc.) in the system 300 are communicatively coupled via an ICN 350. In one embodiment, an ICN includes interconnects (e.g., interconnects 352, 354, 355, 357, etc.) that communicatively couple components (memory cards, PPUs, etc.). The interconnects can be a direct connection. The interconnects can have various configurations (e.g., switched, multiple hierarchical switches, etc.). In one embodiment, an interconnect is a hard-wired or cable connection that directly connects a PPU to a memory card. It is appreciated there can be various connection topology configurations. In one embodiment, the interconnects are lines or cables based on or utilizing Serial/Deserializer (SerDes) functionality. In one embodiment, the number of ICN links or interconnects between a memory card and a PPU is based on the bandwidth of the memory card. In one exemplary implementation, the bandwidth of links or interconnects in an ICN matches the bandwidth of the memory card.

In one embodiment, a system can include and leverage communication between PPUs to further increase overall memory flexibility and extendibility. In one embodiment, the PPUs on the compute node 310 can effectively increase memory extension and flexibility by communicating with (are communicatively coupled to) each other over the ICN 350 and accessing each other's local memory card. In one exemplary implementation, in addition to accessing memory card 311, PPU 312 can access memory card 317 via communication over ICN 350 and PPU 319. In one embodiment, the PPUs on the compute node 310 can effectively increase memory extension and flexibility by communicating with (are communicatively coupled to) PPUs in compute node 370 over the ICN 350 and accessing each other's local memory card. In one exemplary implementation, in addition to accessing memory card 311, PPU 312 can access memory card 371 and 372 via communication over ICN 350 and PPU 377.

It is appreciated that presented flexible extendable memory architectures are compatible with systems that also include other communication features and capabilities in addition to ICN approaches. In one embodiment, a system can include and leverage multiple communication protocols to further increase overall memory flexibility and extendibility. The memory cards and PPUs included in a compute node can communicate with one another over other buses in addition to ICNs. In one embodiment, memory cards and PPUs of a compute node are communicatively coupled to both an ICN and a Peripheral Component Interconnect Express (PCIe) bus. In one embodiment, PPUs (e.g., 312, 391, etc.) on compute node (e.g., 310, etc.) can access memory cards (e.g., 311, 317, via a bus (e.g., 381, etc.) in addition to ICN 350. In one embodiment, PPUs can access memories on different compute nodes. The compute node 310 includes a host central processing unit (CPU) 391, and is connected to a network 340 via a network interface controller or card (NIC) 392. The compute node 370 includes a host central processing unit (CPU) 397, and is connected to a network 340 via a network interface controller or card (NIC) 398. PPUs on compute node 310 can communicate with the memory cards and PPUs on the compute node 370 over the network 340 via the buses 381 and 382 and the NICs 392 and 398.

In one embodiment, the PPUs may also be implemented using, or may be referred to as, PPUs that are included in a neural network. The PPUs may also be implemented as, or using, PPUs implementing policy processing applications. A PPU can also include other functional blocks or components (not shown) such as a command processor, a direct memory access (DMA) block, and a PCIe block that facilitates communication to a PCIe bus.

Figure 4A:
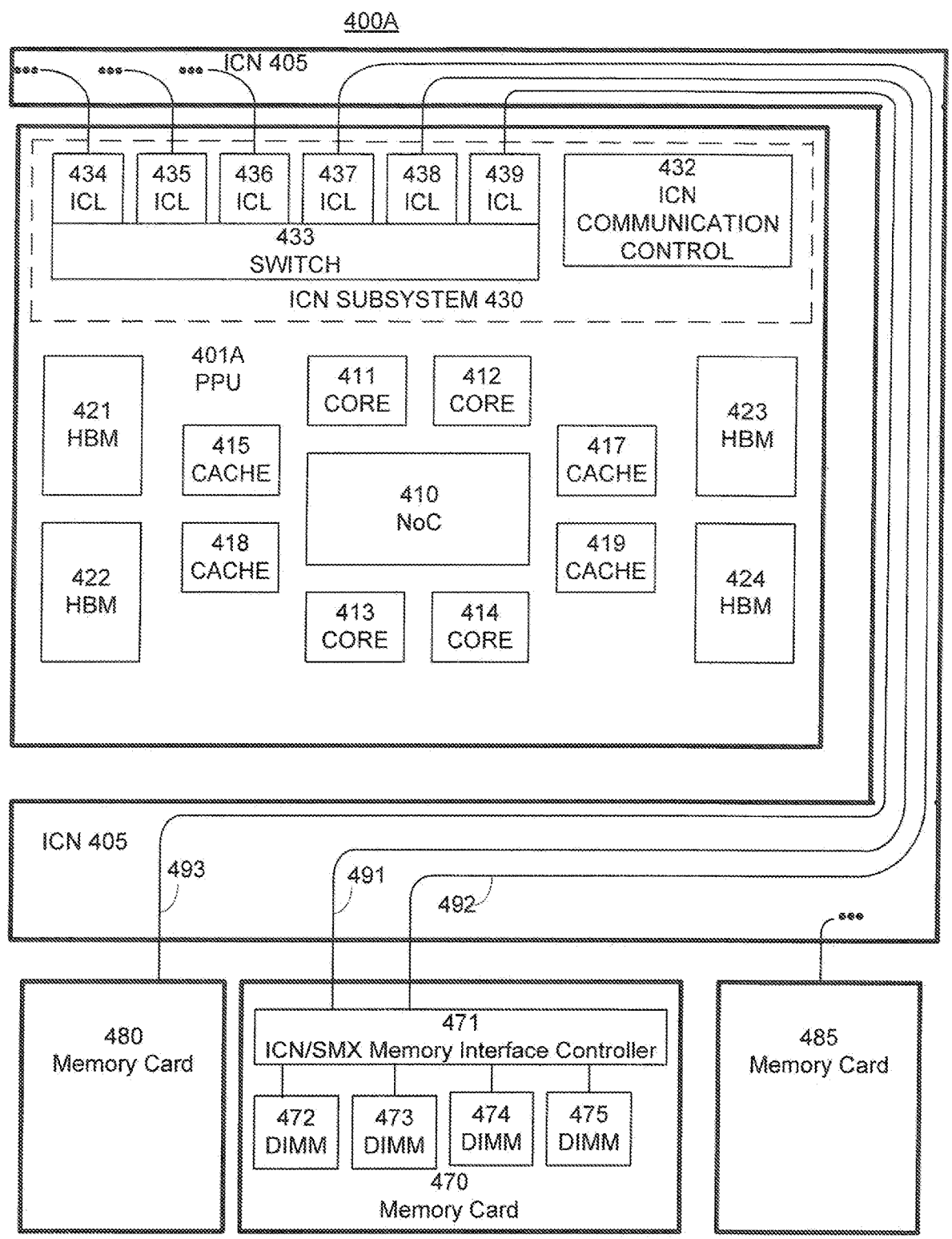
FIG. 4A is a block diagram of an exemplary PPU ICN control for a flexible and extendable memory architecture in accordance with one embodiment.

FIG. 4A is block diagram of exemplary system 400A in accordance with one embodiment. System 400A includes PPU 401A and memory cards 470, 480 and 485. PPU 401A is communicatively coupled to ICN 405. Memory cards 470, 480 and 485 are also communicatively coupled to ICN 425. In one embodiment, a PPU has access to both internal or on-chip memory (e.g., 415, 417, 421, 422, etc.) and external or off chip memory (e.g., memory cards 470, 480 and 485, etc.). In one exemplary implementation, a PPU directs communication with external memory via an ICN. In general, a PPU can include elements such as a processing core and internal or on-chip memory. The PPU 401A includes a network-on-a-chip (NoC) 410 communicatively coupled to a computing element or processing core (e.g., 411, 412, 413, 414, etc.) and a cache (e.g., 415, 417, 418, 419, etc.). PPU_0 also includes high bandwidth memories (e.g., 421, 422, 423, 424, etc.) communicatively coupled to the NoC 410. The caches and HBMs can be considered internal or on chip memories. In one embodiment, a cache is the last level of information storage between a HBMs and CPU/Cores communicatively coupled via an NoC. A compute node can include other levels of caches (e.g., L1, L2, etc.). Memory space in the HBMs can be declared or allocated (e.g., at runtime) as buffers (e.g., ping-pong buffers, etc.).

The PPUs also include a ICN subsystem that handles external or off chip communication via an ICN to external memory and other PPUs. PPU 401A includes ICN subsystem 430. The PPU is communicatively coupled to the ICN 405 by the ICN subsystem 430 which is coupled to the NoC 410. The ICN subsystem 430 includes an ICN communication control block (communication controller) 432, the switch 433, and inter-communication links (ICLs) 434, 435, 436, 437, 438, and 439. An ICL can constitute or include a communication port. In one embodiment, the ICLs 434, 435, 436, 437, 438, and 439 are connected to a respective interconnect of ICN 405. The interconnect can be a direct connection. The interconnect can be through an external switch device. In one exemplary implementation, one end of interconnects 491 and 492 can be connected to ICL (port) 437 and 438 (respectively) on the PPU 401A and the other end of the connections 491 and 492 can be connected to the ICN/SMX memory interface controller 471 on the memory card 470. Memory card 470 includes ICN/SMX memory interface controller 471 and Dual Inline Memory Modules (DIMM) 472, 473, 474, and 475. Memory cards 480 and 485 are similar to memory card 470 and are communicatively coupled to PPU 401A. Memory card 480 is communicatively coupled to PPU 401A via connection 493 of ICN 405. Memory Card 485 is communicatively coupled to another PPU (not shown).

In one embodiment, a memory access request (e.g., a read request, a write request, etc.) by PPU 401A is issued from cores (e.g., 411, 412, etc.) via the NoC 410 to the ICN communication control block 432 of ICN subsystem 430. The memory access request includes an address that identifies which memory location is the destination of the memory access request. The ICN communication control block 432 uses the address to determine which of the ICLs is connected (directly or indirectly) to the memory location (e.g., memory card, memory module, etc.) associated with the address. The memory access request is then routed to the selected ICL (e.g., 437, 438, 439, etc.) by the switch 433, then through the ICN 405 to the memory card (e.g., 470, 480, etc.) associated with the address. In one exemplary implementation, the memory access request is to a memory address in memory card 470. At the receiving end, the memory access request is received at the ICN/SMX memory interface controller 471 in memory card 470. If the access request is a write the information is forwarded to and stored in a corresponding DIMM (e.g., 472, 473, 474, 475, etc.) identified in the access request. If the memory access request is a read request, then information at the address in the DIMM is returned to PPU 401A. In this manner, memory access is expeditiously accomplished using the high-bandwidth ICN 405. In one embodiment, the access communication bypasses other communication buses (e.g., a PCIe bus, etc.) and thereby avoid bandwidth limitations and relative lack of speed of the other buses.

Figure 4B:
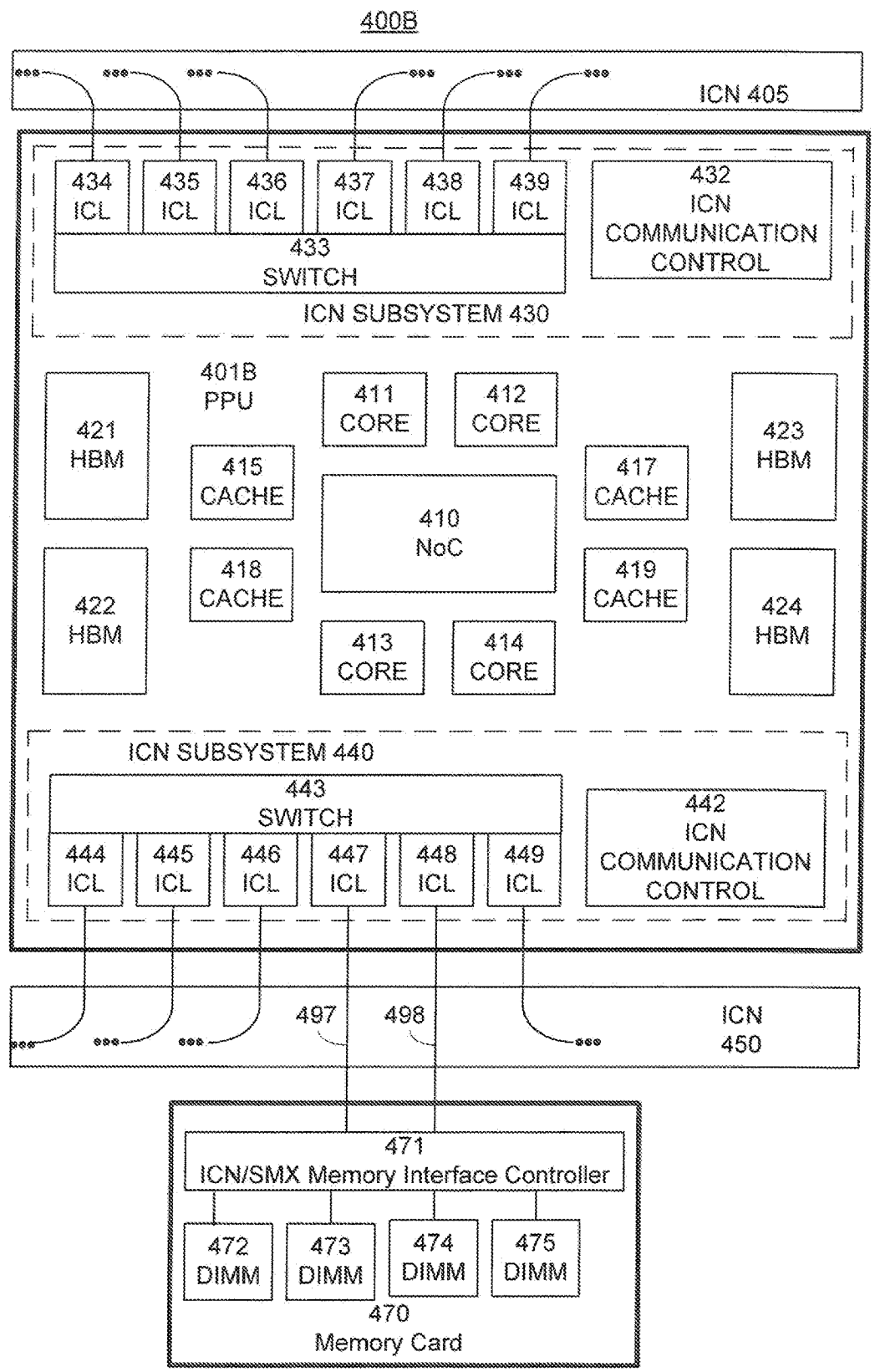
FIG. 4B is a block diagram of another exemplary flexible and extendable memory architecture in accordance with one embodiment.

It is appreciated that the presented ICN communication schemes can enable flexible memory extension and utilization. FIG. 4B is a block diagram of an exemplary system 400B in accordance with one embodiment. System 400B is similar to System 400A except the PPU 401B of system 400B also includes ICN subsystem 440 and ICN 450 communicatively couples PPU 401B to the memory cards 470, 480 and 485 via ICN subsystem 440. The ICN subsystem 440 includes an ICN communication control block (communication controller) 442, the switch 443, and inter-communication links (ICLs) 444, 445, 446, 447, 448, and 449. An ICL can constitute or include a communication port. In one embodiment, the ICLs 444, 445, 446, 447, 448, and 449 are connected to a respective interconnect of ICN 450. The interconnect can be a direct connection. In one exemplary implementation, one end of interconnects 497 and 498 can be connected to ICL (port) 447 and 448 (respectively) on the PPU 401B and the other end of the connections 491 and 492 can be connected to the ICN/SMX memory interface controller 471 on the memory card 470.

In one embodiment, the ICN communication control block 432 includes a command dispatch block and an instruction dispatch block. The command dispatch block and the instruction dispatch block are used for a memory access request by the PPU 401A that addresses another PPU. The command dispatch block is used for a memory access request that involves relatively large amounts of data (e.g., two or more megabytes). The instruction dispatch block provides a finer level of control, and is used for a memory access request that involves smaller amounts of data (e.g., less than two megabytes; e.g., 128 or 512 bytes). Generally speaking, in embodiments, the command dispatch block handles ICN reads and writes, and the instruction dispatch block handles remote stores and remote loads, although the present invention is not so limited. Commands from the communication command rings are sent to the command dispatch block. Instructions from the NoC 410 are sent to the instruction dispatch block. The instruction dispatch block may include a remote load/store unit (not shown).

More specifically, when a compute command is decomposed and dispatched to one (or more) of the cores (e.g., 411, 412, etc.), a kernel (e.g., a program, or a sequence of processor instructions, etc.) will start running in that core or cores. When there is a memory access instruction, the instruction is issued to memory. If the memory address is determined to be a local memory address, then the instruction goes to a local HBM (e.g., 421, 422, etc.) via the NoC 410; otherwise, if the memory address is determined to be an external memory address, then the instruction goes to an instruction dispatch block.

An ICN subsystem can also include a number of chip-to-chip (C2C) DMA units that are coupled to the command and instruction dispatch blocks. The DMA units are also coupled to the NoC via a C2C fabric and a network interface unit (NIU), and are also coupled to the switch (e.g., 433, 443, etc.), which in turn is coupled to ICLs that are coupled to the ICN (e.g., 405, 450, etc.).

The ICN communication control block 432 maps an outgoing memory access request to an ICL (434, 437, etc.) that is selected based on the address in the request. The ICN communication control block 432 forwards the memory access request to a DMA unit that corresponds to the selected ICL. From the DMA unit, the request is then routed by the switch 433 to the selected ICL.

In one embodiment, PPUs and memory cards in systems 400A and 400B are similar to PPUs and memory cards in systems 200A, 200B, 300, and so on.

In one embodiment, a system (e.g., 200A, 200B, 300, 400A, 400B, etc.) incorporates unified memory addressing space using, for example, the partitioned global address space (PGAS) programming model. Accordingly, memory space in a system can be globally allocated so that the HBMs 216 on the PPU 210, for example, are accessible by the PPUs on that compute node (e.g., 201, etc.) or server and by the PPUs on other compute nodes or servers in the system (e.g., 200A, 200B, etc.), and PPU 210 can access the HBMs on other PPUs/servers in the system. Thus, in the example of FIG. 2A, one PPU can read data from, or write data to, another PPU in the system 200A, where the two PPUs may be on the same compute node (e.g., server, etc.) or on different compute nodes (e.g., servers, etc.), and where the read or write can occur either directly or indirectly as described above.

Figure 5:
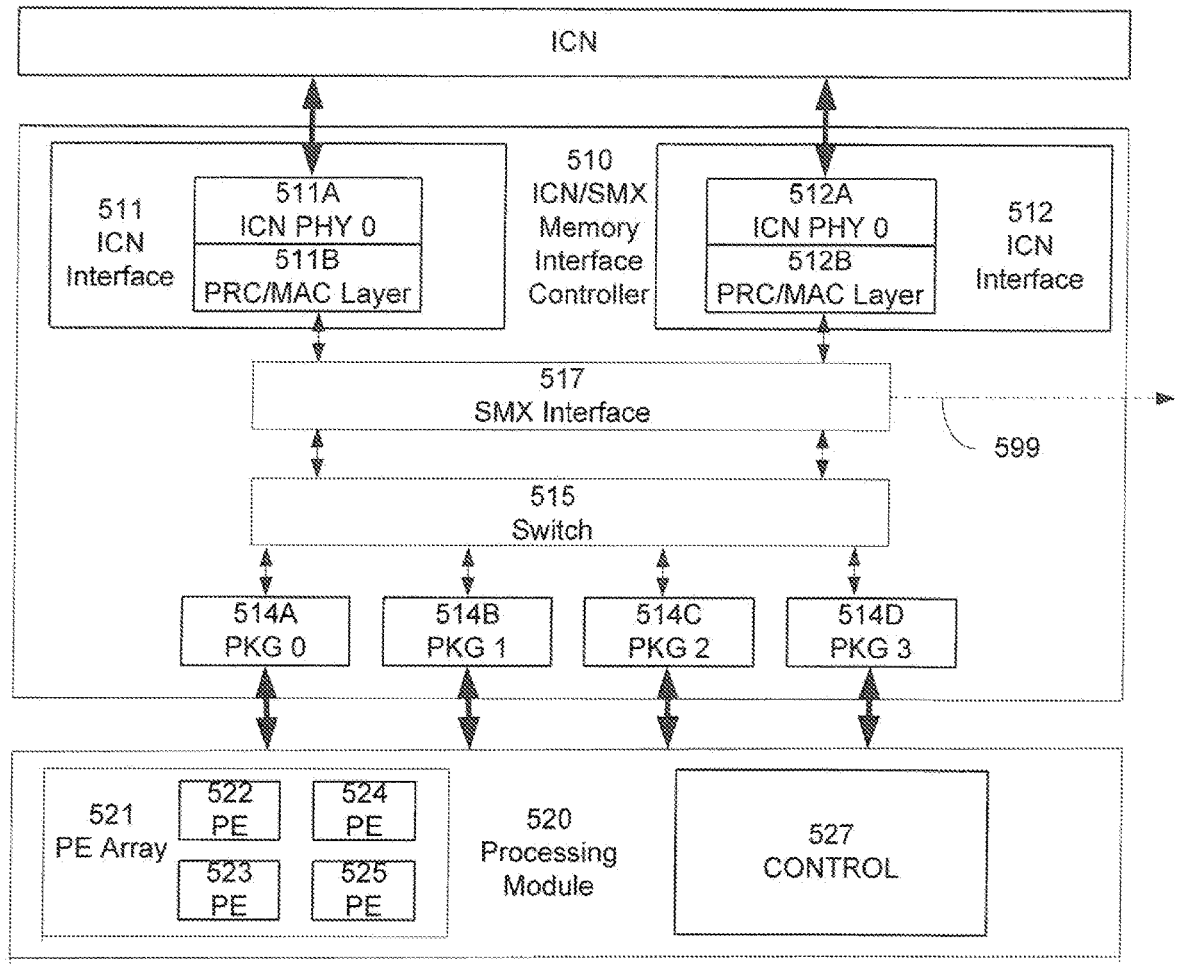
FIG. 5 is a block diagram of an exemplary memory card in accordance with one embodiment.
Figure 5:
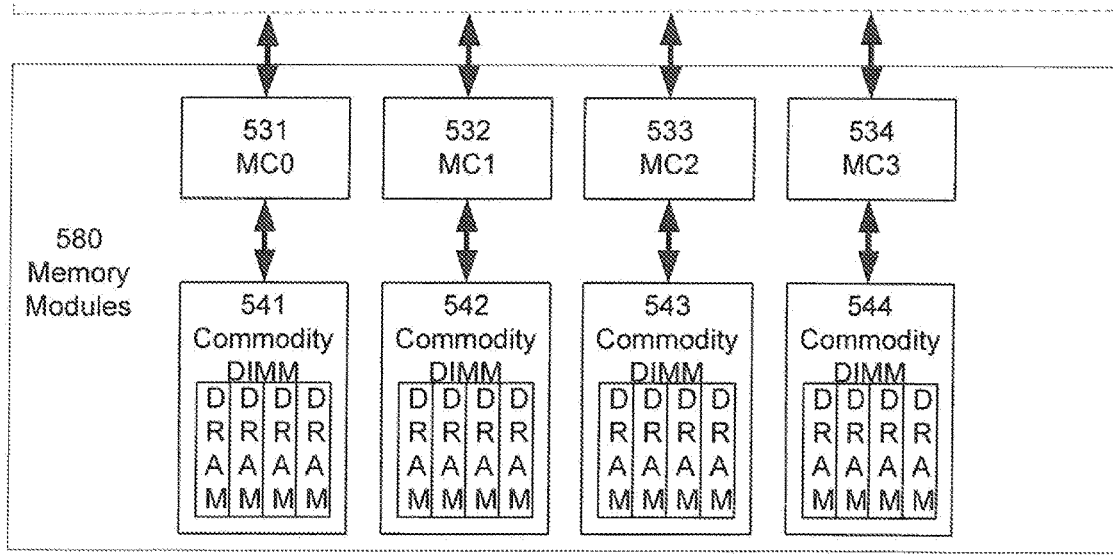

FIG. 5 is a block diagram of an exemplary memory card 500 in accordance with one embodiment. In one exemplary implementation, memory card 500 is similar to memory card 250. Memory card 500 includes ICN/SMX memory interface controller 510, processing module 520, and memory modules 580. ICN/SMX memory interface controller 510 includes ICN interfaces 511 and 512, SMX Interface 517, switch 515, package buffers 514A through D. ICN interfaces 511 and 512 include an ICN physical layer interface (e.g., 511A, 512A, etc.), a PRC/MAC interface (e.g., 511B, 512B, etc.). The plurality of package buffers are configured to buffer information packages. The ICN physical layer interface is configured to couple with portions of the ICN coupled to processing units. The respective PRC/MAC interface is coupled to the respective ICN physical layer. In one embodiment, the SMX interface 517 is configured to implement SMX communications and couple with portions of the ICN interfaces 511 and 512. The switch 515 is configured to route information to the plurality of package buffers (e.g., 514A, 514B, 514C, and 514D, etc.), and the SMX interface 517.

A memory card can include a processing element array component or module (e.g., 520, etc.) configured to perform parallel processing on the memory card. In one embodiment, a processing element array component/module includes a plurality of process elements configured to process the information; and a process element controller configured to control a flow of the information to and from the plurality of process elements. Processing module 520 includes processing array 521 and control module 527. Processing array 521 includes processing elements 522, 523, 524, and 525. The processing elements can be specialized or customized purpose processing elements. The specialized or customized purpose processing elements can be directed to particular application processing. It is also appreciated the processing elements can be general purpose processing elements (e.g., CPU, GPU, etc.).

Memory modules 580 includes memory controllers 531, 532, 533 and 534 communicatively coupled to commodity DIMM 541, 542, 543, and 544 respectively. In one embodiment, the DIMMs include DRAMs. It is appreciated that various types of memory (e.g., RAM, DRAM, flash, etc.) can be utilized and can be compatible with different standards and protocols (e.g., DDR4, DDR5, etc.).

In one embodiment, memory card 500 can also include memory operation component 570. Memory operation component 570 can perform various functions directed to memory operations. The functions can be associated with flow control, reliability features, serviceability features, error correction code functionality, log features, and so on. The memory operation component 570 can include caches to help deal with or avoid latency issues.

In one embodiment, the SMX interface 517 can also communicatively couple with communication links that have communication configurations and protocols different than ICN. The SMX interface can communicate with other non PPU devices that are compatible with SMX device communications. In one exemplary implementation, the SMX interface can communicatively couple to other SMX compatible non-PPU devices via optional communication link 599.

In one embodiment, a memory card and ICN/SMX memory controller are implemented without SMX features. The memory card can be communicatively coupled to another memory card through an ICN and PPU.

Figure 6:
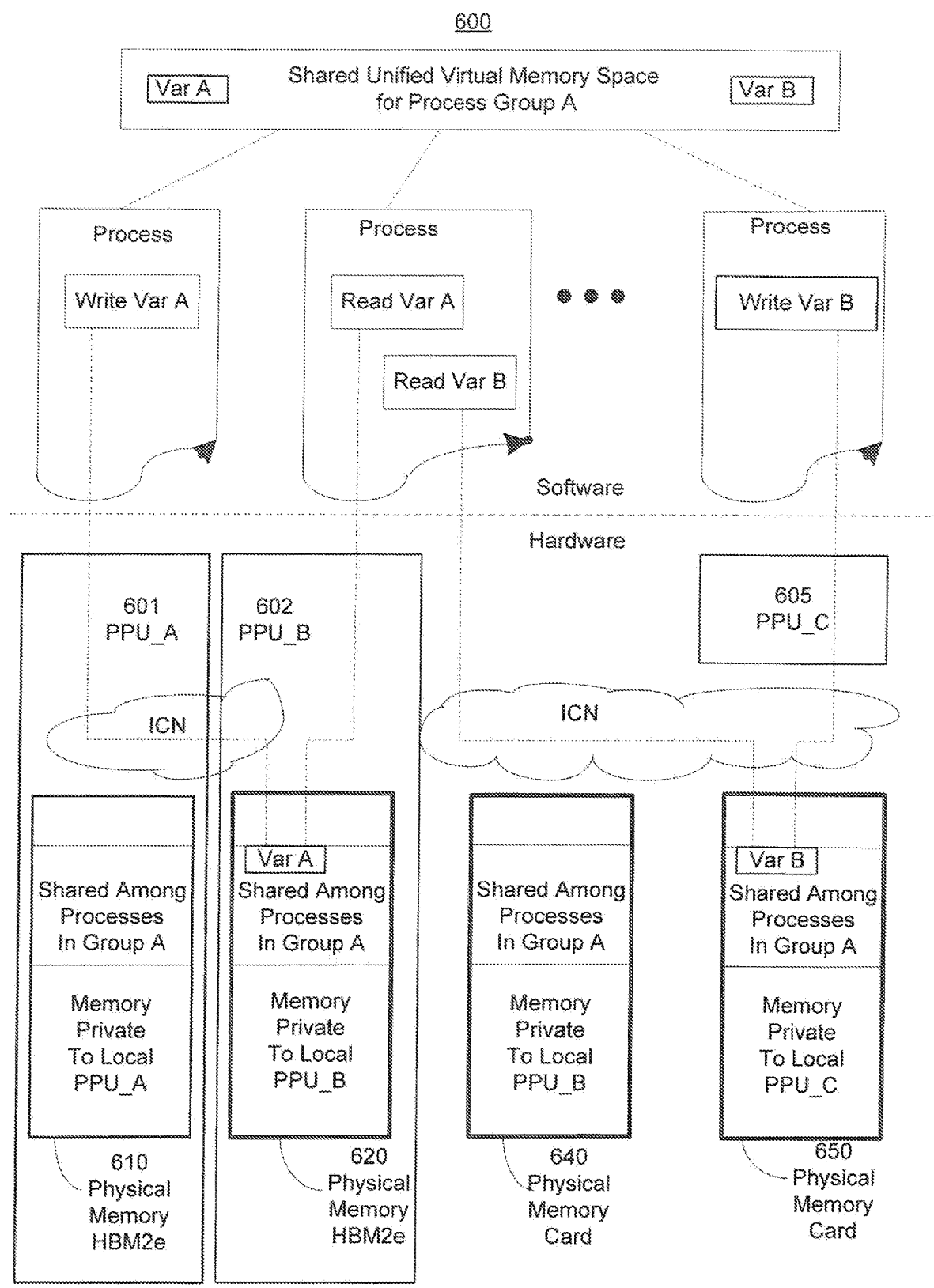
FIG. 6 is a block diagram of an exemplary unified memory addressing space in accordance with one embodiment.

FIG. 6 is a block diagram of an exemplary unified memory addressing space 600 in accordance with one embodiment. The unified memory addressing space 600 can enable implementation of a partitioned global address space (PGAS) style program model. The communication between programs flows at different levels. In a command level the communication can include a direct memory access (DMA) copy operation. In an instruction level the communication can include a direct load/store operation. Unified memory addressing space can be implemented on portions of physical memory HBM2e 610, physical memory HBM2e 620, physical memory card 640, and physical memory card 650. In one embodiment, physical memory HBM2e 610 is included in PPU_A 601, physical memory HBM2e 620 is included in PPU_B 602, and physical memory card 650 is communicatively coupled via an ICN to PPU_C 605. In one embodiment, a process running on PPU_B can read information Var A from physical memory 620 (that was written by a process running on PPU_A) and can also read information Var B from physical memory card 650 (that was written by a process running on PPU_C). Thus, a processing component (e.g., PPU, etc.) can quickly and conveniently access information stored in various memory components (e.g., HBM2e, memory cards, etc.) that are dynamically configurable in a flexible and extendible architecture.

Figure 7:
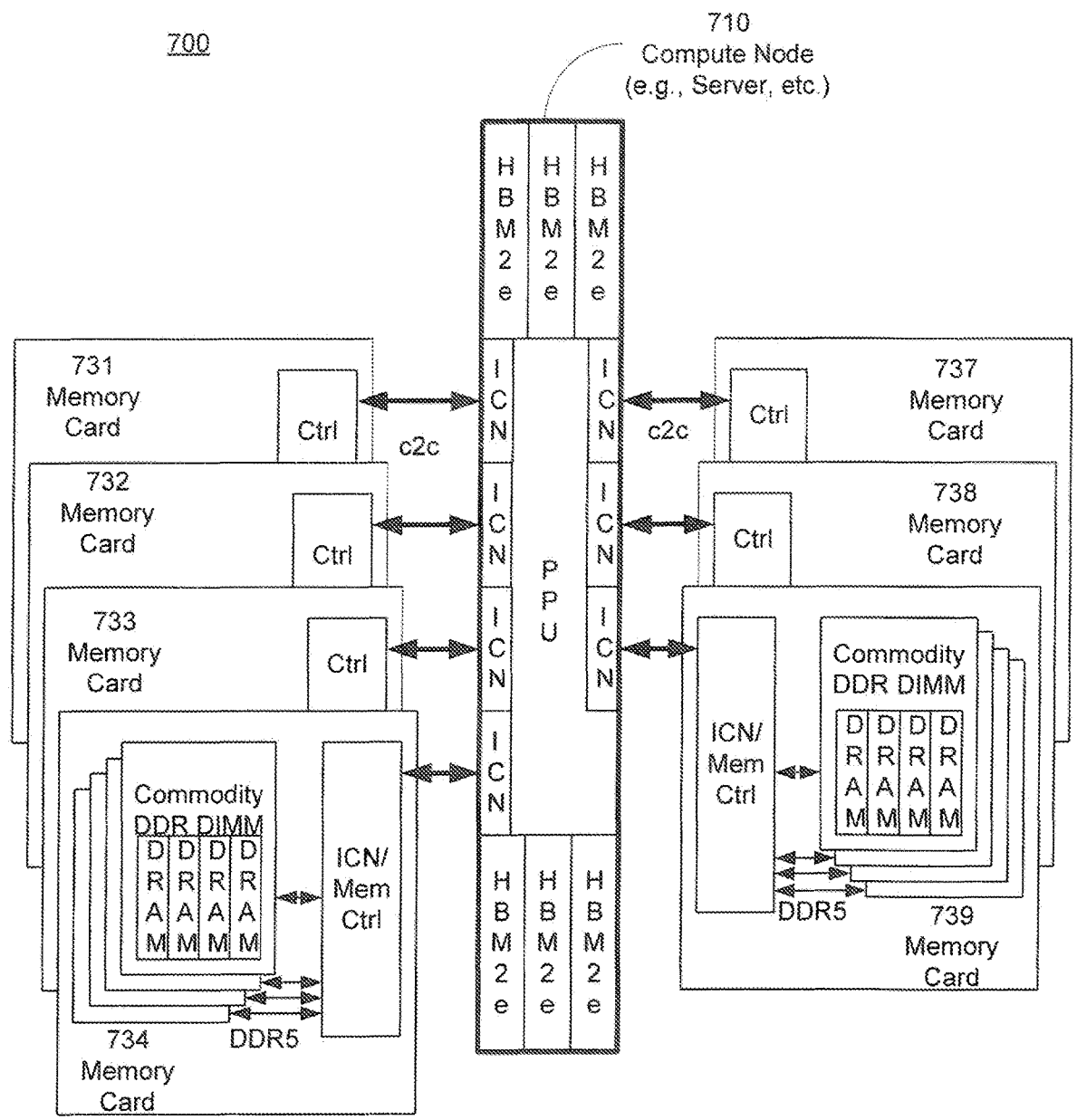
FIG. 7 is a block diagram of an exemplary system with multiple memory cards in accordance with one embodiment.

It is appreciated that presented SMX/ICN approaches are compatible with various system configurations. FIG. 7 is a block diagram of an exemplary system 700 with multiple memory cards in accordance with one embodiment. System 700 includes compute node (e.g., server, etc.) 710 and memory cards 731, 732, 733, 734, 737, 738, and 730. In one exemplary implementation, memory cards 731, 732, 733, 734, 737, 738, and 730 are similar to memory card 600.

Figure 8:
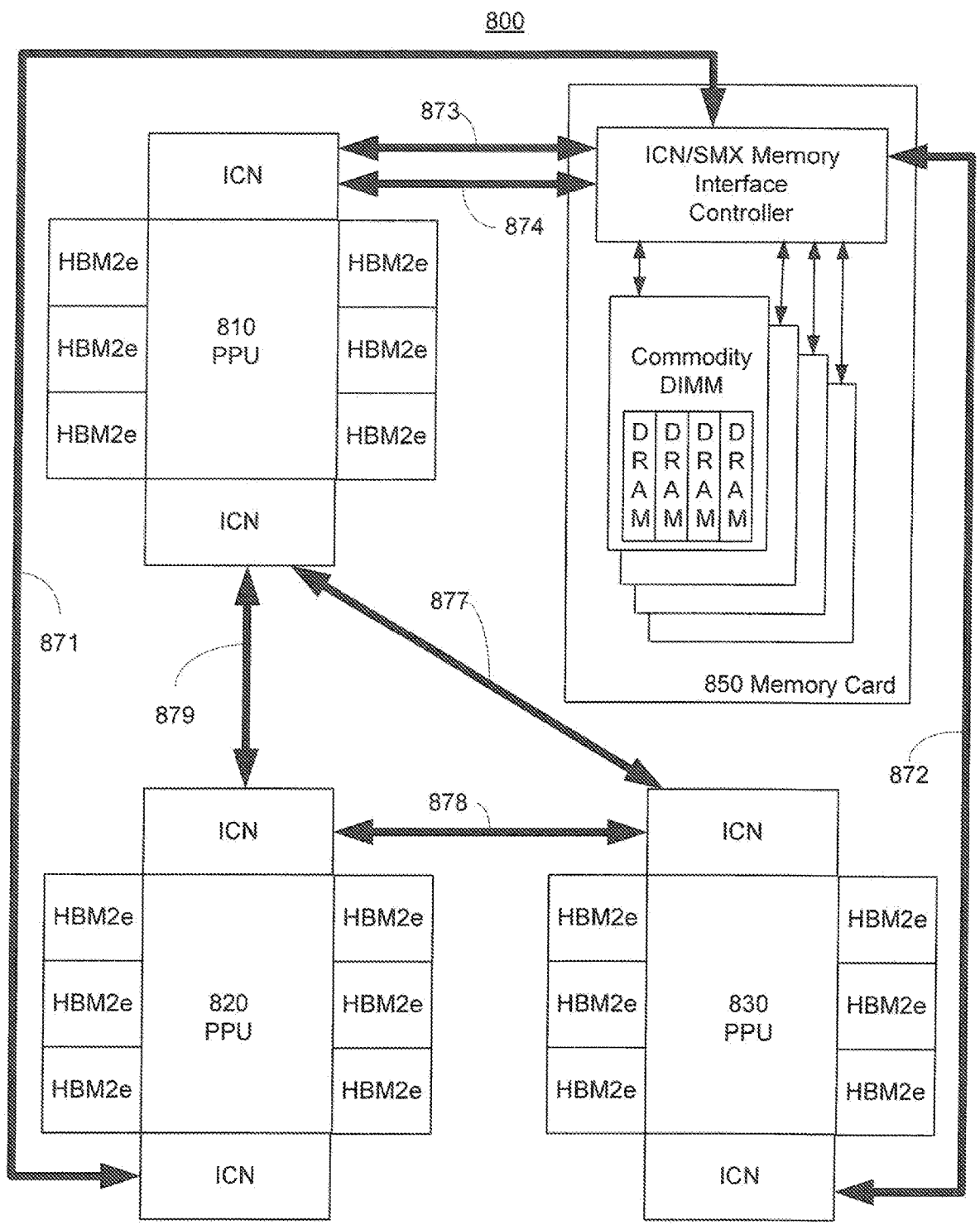
FIG. 8 is a block diagram of an exemplary communication between multiple CPUs and a shared memory extension card.

FIG. 8 is a block diagram of exemplary system 800 communications between multiple PPUs and a shared memory expansion card in accordance with one embodiment. System 800 includes memory card 850 and PPUs 810, 820, and 830. PPU 810 is communicatively coupled to PPU 820 via ICN link/interconnect 879. PPU 820 is communicatively coupled to PPU 830 via ICN link/interconnect 878. PPU 830 is communicatively coupled to PPU 810 via ICN link/interconnect 877. PPU 830 is communicatively coupled to memory card 850 via ICN link/interconnect 872. PPU 820 is communicatively coupled to memory card 850 via ICN link/interconnect 871. PPU 810 is communicatively coupled to memory card 850 via ICN link/interconnect 873 and 874. Multiple ICN links/interconnects between a PPU and a memory card (e.g., 873, 874 etc.) enables greater bandwidth (e.g., double a single link, triple a single link etc.).

Figure 9:
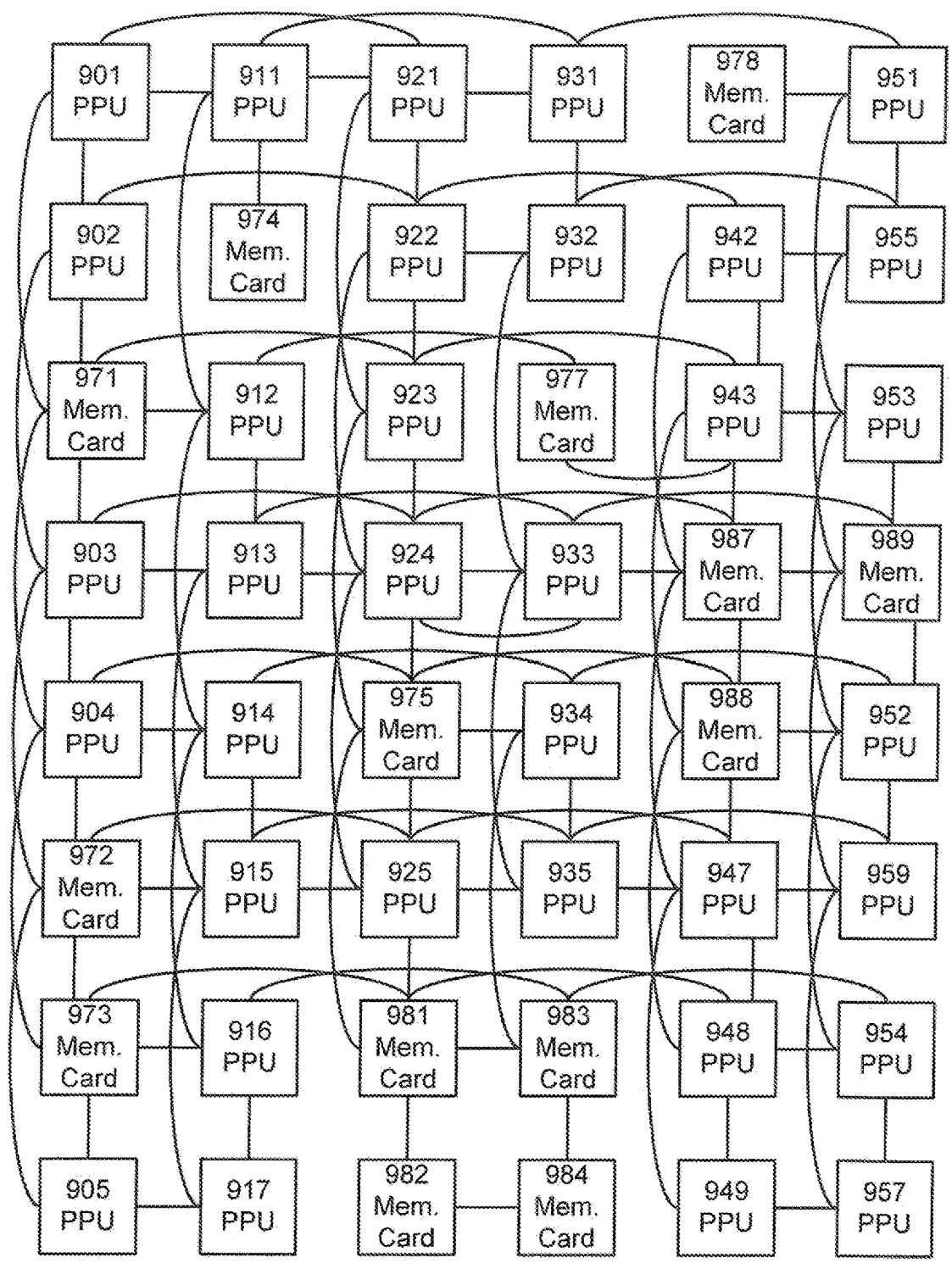
FIG. 9 is a block diagram of a scaling hierarchy in accordance with one embodiment.

FIG. 9 is a block diagram of a scaling hierarchy 900 in accordance with one embodiment. In one exemplary implementation, the scaling hierarchy includes communication between multiple PPUs and corresponding memory (not shown) that are communicatively coupled via ICNs in a flexible and extendable architecture. In one exemplary implementation, the scaling hierarchy includes communication between multiple PPUs and corresponding memory (not shown) that are communicatively coupled via ICNs in a flexible and extendable architecture, system 900 includes PPUs 901, 902, 903, 904, 905, 911, 912, 913, 914, 915, 916, 917, 921, 922, 923, 924, 925, 931, 932, 933, 934, 935, 942, 943, 947, 948, 949, 951, 952, 953, 954, 955, 957, and 959. System 900 also includes memory cards 971, 972, 973, 974, 975, 977, 978, 981, 982, 983, 984, 987, 988, and 989. A single memory card can be communicatively coupled to a PPU (e.g., memory card 974 communicatively coupled to PPU 911, etc.). Multiple memory cards can be communicatively coupled to a PPU (e.g., memory cards 988 and 999 communicatively coupled to PPUs 952, etc.). It is appreciated that there can be various coupling configurations of components to an ICN, including one memory card to one PPU (e.g., 1v1, etc.), one memory card to multiple PPUs (e.g., 1vn, etc.), multiple memory cards to one PPU (e.g., nv1, etc.), multiple memory cards to multiple PPUs (e.g., nvn, etc.), and so on.

In one embodiment, the systems and components described herein (e.g., 200, PPU_0, memory card 250, etc.) are examples of systems and components for implementing methods such as those disclosed herein.

FIG. 10 is a block diagram of an exemplary information storage method in accordance with one embodiment.

In block 1010, a memory communication is generated in a first processing component. In one embodiment, the memory communication comprises an address associated with a storage location in a first memory component and the memory communication is compatible for communication over an inter-chip network (ICN).

In block 1020, an interconnect is selected from among a plurality of interconnects included in the ICN. In one exemplary implementation, a selected interconnect couples the first processing component and the first memory component. In one embodiment, the first processing component and first memory component are included in a first node of the ICN, and wherein the first processing component and first memory component are also communicatively coupled to each other via a bus included in the first node, and the bus does not include the ICN. The first memory component can be included in a first node of the ICN and a second memory component can be included in a second node of the ICN. The first memory component and second memory component can be communicatively coupled to the ICN. The first memory component and second memory component can also be communicatively coupled via another network in addition to the ICN. The ICN can enable dynamic flexible extension of available memory resources for PPUs communicatively coupled to the ICN. In one exemplary implementation, the other network is communicatively coupled to a first network interface card included in the first node and a second interface card included in the second node. In one embodiment, the first memory component and second memory component are included in a first node of the ICN, and the first memory component and second memory component are communicatively coupled to one another via a shared memory extension (SMX) protocol.

In block 1030, the memory communication request is forwarded from the first processing component towards the first memory component via the selected interconnect included in the ICN. The information can be pushed from the first memory component to the second memory component in a push mode and the information can be pulled from the second memory component to the first memory component in a pull mode.

In one embodiment, the method can further include receiving additional information via another interconnect included in the ICN.

In one embodiment, the ICN is implemented in a shared memory extension SMX architecture. The presented high-speed interconnect interface (e.g., PPU ICN protocol) can be used to extend/expand the PPU (e.g., GPU, CPU, etc.) high speed memory and provide large capacity and high flexibility PPU memory solutions. In one exemplary implementation, the ICN is compatible with HBM+DDR5 unified addressing (unified memory space), Byte addressable/Memory semantic data reading, and zone-based memory management. The presented ICN offers significant flexibility (e.g., flexible support for PPU expanded memory pooling, flexible and matchable memory/computing resource ration, etc.). In one embodiment, the ICN with SMX interfaces can enable integration of long path computing and graph computing acceleration modules. The ICN can be compatible with PCIe board form realization. The ICN with SMX interfaces can be considered a highspeed memory extension/expansion architecture. In one exemplary implementation, communication module interconnection solutions are based on high speed SerDes IP-based ICN. The memories can include a computation module (e.g., Control logic+arithmetic location, etc.) and storage modules. In one exemplary implementation, the approach is compatible with DDR/SCM control units.

The presented systems enable efficient and effective network communications. In one embodiment a memory device includes a memory module, including a plurality of memory chips configured to store information; and an inter-chip network (ICN)/shared smart memory extension (SMX) memory interface controller (ICN/SMX memory interface controller) configured to interface between the memory module and an inter-chip network (ICN), wherein the ICN is configured to communicatively couple the memory device to a parallel processing unit (PPU). In one exemplary implementation, the ICN/SMX memory interface controller includes an ICN interface, a shared smart memory extension (SMX) interface, a plurality of package buffers, and a switch. The ICN interface is configured to communicatively couple with the ICN. The shared smart memory extension (SMX) interface is configured to communicatively couple with the ICN interface. The plurality of package buffers are configured to buffer information packages from the SMX interface. The switch is configured to communicatively couple the plurality of package buffers to the SMX interface and route information to and from the plurality of package buffers.

It is appreciated that the ICN/SMX memory interface can enable flexible extension of memory resources available to processing resources. In one embodiment, the ICN/SMX memory interface and ICN enable a direct communication connection between the memory device and the PPU, wherein the direct connection flexibly extends the PPU access to the memory module. The ICN/SMX memory interface and ICN can enable a communication coupling between the memory device and the PPU that is overall faster than other communication buses between the memory device and PPU. In one exemplary implementation, the direct connection flexibly extends access by both the PPU and another PPU to the memory module.

A memory device can include a processing element array component configured to perform parallel processing on the memory device. In one embodiment, a processing element array component includes a plurality of process elements configured to process the information; and a process element controller configured to control a flow of the information to and from the plurality of process elements. In one exemplary implementation, a processing element array component processes information associated with accelerating graph processing.

It is appreciated the memory device can be compatible with various memory configurations. The ICN/SMX memory interface controller can be dynamically configurable for various flexible extension architecture configurations, including one memory device to one PPU, one memory device to multiple PPUs, multiple memory devices to one PPU, and multiple memory devices to multiple PPUs. The memory device can be configured as a memory card including a memory module. The memory module can be a dual in-line memory module (DIMM). The memory module can be a double data rate dual in-line memory module (DDR DIMM).

In one embodiment, an information storage or memory storage communication method is implemented. In one exemplary implementation the method includes generating a memory access request in a first processing component, selecting an interconnect from among a plurality of interconnects included in the ICN, and forwarding the memory access request from the first processing component towards the first memory component via the selected interconnect included in the ICN. In one embodiment, the memory access request comprises an address associated with a location in a first memory component and the memory access request is compatible for communication over an inter-chip network (ICN). The communication can be compatible with a shared memory extension protocol. In one exemplary implementation, a selected interconnect couples the first processing component and the first memory component.

In one embodiment, the first processing component and first memory component are included in a first node of the ICN, and wherein the first processing component and first memory component are also communicatively coupled to each other via a bus included in the first node, wherein the bus does not include the ICN. The first memory component can be included in a first node of the ICN and a second memory component can be included in a second node of the ICN. The first memory component and second memory component can also be communicatively coupled via another network in addition to the ICN. In one exemplary implementation, the ICN can enable dynamic flexible extension of available memory resources for PPUs communicatively coupled to the ICN. In one exemplary implementation, the other network is communicatively coupled to a first network interface card included in the first node and a second interface card included in the second node. The first memory component and a second memory component can be included in a first node of the ICN and the first memory component and second memory component are communicatively coupled to one another via a shared memory extension protocol. The information can be pushed from the first memory component to the second memory component in a push mode and the information can be pulled from the second memory component to the first memory component in a pull mode. In one embodiment, the method can further include receiving another memory access request via another interconnect included in the ICN.

In one embodiment a system includes: a plurality of processing cores, a plurality of memories, and a plurality of interconnects in an inter-chip network (ICN). A first set of the plurality processing cores can be included in a first chip. The plurality of memories include a first memory set that is internal memory in the first chip and a second memory set that is external memory. The first set of memories and the second set of memories are coupled to the first set of the plurality of processing cores. The ICN is configured to communicatively couple the plurality of processing cores and the second memory set. The second memory set is available to the plurality of processing cores as an extension to the first memory set. The second memory set can include a memory device comprising: a memory module, including a plurality of memory chips configured to store information, and ICN/SMX memory interface controller configured to interface between the memory module and an inter-chip network (ICN) configured to communicatively couple the plurality of processing cores and the second memory set enabling flexible extension of memory resources available to the plurality of processing cores. The ICN can include interconnection links that communicatively couple a parallel processing unit (PPU) and the second memory set, wherein the PPU includes the plurality of processing cores and the first memory set. In one embodiment, memories within the second memory set are communicatively via a shared smart memory extension (SMX) protocol. In one exemplary implementation, the second memory set is communicatively coupled to a second set of the plurality of processing cores via the ICN, and the second memory set and ICN enable flexible extension of memory resources available to the second set of the plurality of processing cores. The ICN/shared memory extension (SMX) controller can dynamically configurable for various flexible extension architecture configurations, including one memory card to one PPU, one memory card to multiple PPUs, multiple memory cards to one PPU, and multiple memory cards to multiple PPUs.

In one exemplary application, embodiments according to the present disclosure provide an improvement in the functioning of computing systems in general and applications such as, for example, neural networks and AI workloads that execute on such computing systems. More specifically, embodiments according to the present disclosure introduce methods, programming models, and systems that increase the speed at which applications such as neural network and AI workloads can be operated, by increasing the speeds at which memory access requests (e.g., read requests and write requests) between elements of the system are transmitted and resultant data transfers are completed.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of configurations. In addition, any disclosure of components contained within other components should be considered as examples because many other architectures can be implemented to achieve the same functionality.

Although the subject matter has been described in language specific to structural features and/or methodological acts, it is to be understood that the subject matter defined in this disclosure is not necessarily limited to the specific features or acts described above. Rather, the specific features and acts described above are disclosed as example forms of implementing this disclosure.

Embodiments according to the invention are thus described. While the present invention has been described in particular embodiments, the invention should not be construed as limited by such embodiments, but rather construed according to the following claims.

The invention claimed is:

1. A memory device comprising:
a memory module, including a plurality of memory chips configured to store information, wherein the memory module comprises memories within a memory card; and
an inter-chip network (ICN)/shared smart memory extension (SMX) memory interface controller (ICN/SMX memory interface controller) configured to interface between the memory module and an inter-chip network (ICN), wherein the ICN is configured to communicatively couple the memory device to a parallel processing unit (PPU), and the ICN/SMX memory interface controller is compatible with a SMX protocol and an ICN protocol, wherein the SMX protocol enables high speed communication between the memories within the memory card and an ICN protocol enables high speed communication to and from the memory card.

2. The memory device of claim 1, wherein the ICN/SMX memory interface controller comprises:
an ICN interface configured to communicatively couple with the ICN;
a shared smart memory extension (SMX) interface configured to communicatively couple with the ICN interface;
a plurality of package buffers configured to buffer information packages from the SMX interface; and
a switch configured to communicatively couple the plurality of package buffers to the SMX interface and route information to and from the plurality of package buffers.

3. The memory device of claim 1, wherein the ICN/SMX memory interface controller and ICN enable a direct communication connection between the memory device and the PPU, wherein the direct connection flexibly extends the PPU access to the memory module.

4. The memory device of claim 3, wherein the direct communication connection flexibly extends access by both the PPU and another PPU to the memory module.

5. The memory device of claim 1, wherein the ICN/SMX memory interface and ICN enable a communication coupling between the memory device and the PPU that is overall faster than other communication buses between the memory device and PPU.

6. The memory device of claim 1, wherein the memory device further comprises a processing element array component configured to perform parallel processing on the memory device.

7. The memory device of claim 6, wherein the processing element array component processes information associated with accelerating graph processing.

8. The memory device of claim 1, wherein the ICN/SMX memory interface controller is dynamically configurable for various flexible extension architecture configurations, including one memory device to one PPU, one memory device to multiple PPUs, multiple memory device to one PPU, and multiple memory device to multiple PPUs.

9. An information storage method comprising:
generating a memory access request in a first processing component, wherein the memory access request comprises an address associated with a storage location in a first memory component and the memory access request is compatible for communication over an inter-chip network (ICN);
selecting an interconnect from among a plurality of interconnects, wherein a selected interconnect is compatible with a SMX protocol and an ICN protocol, wherein the SMX protocol enables high speed communication between the memories within the memory card and an ICN protocol enables high speed communication to and from the memory card; and
forwarding the memory access request from the first processing component towards the first memory component via the selected interconnect included in the ICN.

10. The information storage method of claim 9, further comprising receiving another memory access request via another interconnect included in the ICN.

11. The information storage method of claim 9, wherein the first processing component and first memory component are included in a first node of the ICN, and wherein the first processing component and first memory component are also communicatively coupled to each other via a bus included in the first node, wherein the bus does not include the ICN.

12. The information storage method of claim 9, wherein the first memory component is included in a first node of the ICN and a second memory component is included in a second node of the ICN, wherein the first memory component and second memory component are also communicatively coupled via another network in addition to the ICN, wherein the ICN enables dynamic flexible extension of available memory resources for PPUs communicatively coupled to the ICN.

13. The information storage method of claim 9, wherein the first memory component and a second memory component are included in a first node of the ICN and the first memory component and second memory component are communicatively coupled to one another via a shared memory extension protocol.

14. The information storage method of claim 13, wherein the information is pushed from the first memory component to the second memory component in a push mode and wherein the information is pulled from the second memory component to the first memory component in a pull mode.

15. A system, comprising:
a plurality of processing cores, wherein a first set of the plurality processing cores are included in a first chip;
a plurality of memories, wherein the plurality of memories include a first memory set that is internal memory in the first chip and a second memory set that is external memory, wherein the first memory set and the second memory set are coupled to the first set of the plurality of processing cores, wherein second memory set includes a memory card, the memory card comprises:
a plurality of memory modules configured to store information; and
an ICN/SMX memory interface controller configured to interface between the plurality of memory modules and an inter-chip network (ICN) configured to communicatively couple the plurality of processing cores and the second memory set enabling flexible extension of memory resources available to the plurality of processing cores, and the ICN/SMX memory interface controller is compatible with a SMX protocol and an ICN protocol, wherein the SMX protocol enables high speed communication between the plurality of memory modules within the memory card and an ICN protocol enables high speed communication to and from the memory card; and
a plurality of interconnects in an inter-chip network (ICN) configured to communicatively couple the plurality of processing cores and the second memory set, wherein the second memory set is available to the plurality of processing cores as an extension to the first memory set.

16. The system of claim 15, wherein the ICN includes interconnection links that communicatively coupled a parallel processing unit (PPU) and the second memory set, wherein the PPU includes the plurality of processing cores and the first memory set.

17. The system of claim 15, wherein memories within the second memory set are communicatively coupled via a shared smart memory extension (SMX) protocol.

18. The system of claim 15, wherein the second memory set is communicatively coupled to a second set of the plurality of processing cores via the ICN, and the second memory set and ICN enable flexible extension of memory resources available to the second set of the plurality of processing cores.

19. The system of claim 15, wherein the ICN/shared memory extension (SMX) controller is dynamically configurable for various flexible extension architecture configurations, including one memory card to one PPU, one memory card to multiple PPUs, multiple memory cards to one PPU, and multiple memory cards to multiple PPUs.

20. The system of claim 15 wherein the plurality of memory modules are double data rate dual in-line memory modules (DDR DIMMs).

* * * * *